United States Patent [19]
Molinski

[11] 3,727,570

[45] Apr. 17, 1973

[54] DRAG REDUCTION METHOD

[75] Inventor: John Molinski, Somerset, Mass.

[73] Assignee: The United States of America as represented by the Secretary of the Navy

[22] Filed: Jan. 20, 1970

[21] Appl. No.: 12,520

[52] U.S. Cl. ............................................... 114/20 R
[51] Int. Cl. ............................................... F42b 19/00
[58] Field of Search ...................... 114/20; 252/363.5; 260/33.4

[56] References Cited

UNITED STATES PATENTS

| 3,382,831 | 5/1968 | Madison | 114/20 |
| 3,382,832 | 5/1968 | Swanson | 114/20 |
| 3,461,089 | 8/1969 | Brindamour | 260/33.4 |
| 3,402,137 | 9/1968 | Fischer | 252/363.5 X |
| 3,364,036 | 1/1968 | Tesko | 252/363.5 X |

Primary Examiner—Benjamin A. Borchelt
Assistant Examiner—Thomas H. Webb
Attorney—R. S. Sciascia, L. I. Shrago and R. K. Tendler

[57] ABSTRACT

A method for reducing drag on a moving aquatic vehicle is disclosed in which long chain high molecular weight polymers are suspended in a liquid fluorocarbon carrier prior to injection of the suspension into the aqueous boundary layer surrounding the vehicle.

3 Claims, No Drawings

DRAG REDUCTION METHOD

The invention described herein may be manufactured and used by or for the Government of the United States of America for governmental purposes without the payment of any royalties thereon or therefor.

This invention relates to drag reduction produced by the injection of polyethylene oxide into the aqueous boundary layer adjacent a marine vehicle and, more particularly, to a method of increasing the rate of solution of polyethylene oxide in the water surrounding this vehicle.

It is well known that the injection of polyethylene oxide solutions or other selected long chain high molecular weight polymers into the water surrounding a moving aquatic vehicle will decrease the drag on this vehicle and enable it to be propelled through the water at increased speed. One of the major difficulties in injecting the polyethylene oxide is the length of time necessary to produce a true solution of a high molecular weight polymer in the surrounding water. Prior art methods described in U.S. Pat. No. 3,286,674, issued to R. G. Thompson et al. on Nov. 22, 1966, and U.S. Pat. No. 3,303,810, issued to W. B. Giles on Feb. 14, 1967, show the injection of a high molecular weight polymer into the boundary layer of a torpedo in order to increase its speed. The polymers in these cases may be either premixed with a water supply or violently mixed with the surrounding seawater. In either case, some difficulty is experienced in producing the above solution at a rate fast enough to produce the desired solution in the boundary layer of a fast-moving aquatic vehicle.

In the present method, fluorocarbons such as Freon are mixed with the polymer to form a liquid suspension. This carrier-polymer suspension, when injected into water, results in the rapid formation of a true aqueous polymer-water solution with the fluorocarbons evaporating or boiling off in a very short time. The use of the fluorocarbon as the suspending agent for long chain polymer compounds greatly reduces the time for getting these polymers into a true solution since the individual molecules are separated in the injected suspension. When liquid freon is used to form the suspension, true solutions are formed in one-fourth the time associated with former mixing methods. Fluorocarbons may be used to advantage whether the long chain polymer is mixed with the water surrounding the aquatic vehicle outside of this vehicle or whether the polymer is premixed with water prior to injection into the boundary layer of the vehicle.

It is therefore an object of this invention to provide a method for increasing the rate of solution of a long chain polymer in water.

It is a further object of this invention to provide a suspension of long chain polymers in a fluorocarbon suspending agent for injection into the boundary layer of a moving aquatic vehicle to reduce the drag thereon.

It is another object of this invention to mix a dry polymer powder with freon to form a suspension which is used in the reduction of drag on a moving aquatic vehicle.

It is a still further object of this invention to provide a method of both reducing noise and drag associated with the movement of a vehicle through an aquatic medium.

Other objects, advantages and novel features of the invention will become apparent from the following detailed description thereof.

One of the mechanisms for increasing the speed of a torpedo through the water while at the same time reducing the noise produced by this torpedo is to inject polyethylene oxide into the boundary layer of the torpedo. The injection of this material into the water reduces the drag on the torpedo significantly if the polyethylene oxide is in true solution at the surface of a torpedo. The present invention is a simple method for producing this true solution. There are various long chain polymers that are available which will in some way improve the drag characteristics of the torpedo. Included among these are polyethylene oxide, polyacrylamide, polyvinylpyrrolidone, amylose, amylopectin, hydroxyethyl cellulose, sodium carboxymethyl cellulose, polyvinyl alcohol, silicone, polyacrylic acid, and Separan AP-30. According to the teachings of this invention, any of these high molecular weight polymers may be used in combination with a fluorocarbon carrier to form suspensions which may be injected into the water surrounding a torpedo. These long chain polymers are used in and usually carried by the torpedo in dry powder form. According to the teachings of this invention, this dry powder is mixed with Freon to form a suspension and placed within the torpedo. The Freon functions as both a suspending agent and a catalyst for the long chain polymers. As a catalyst, the carrier coats each molecule and thus prevents bubbles from forming around the molecule when it is suspended in the polymer. The absence of bubbles around the molecule permits a more rapid rate of solution for the polymer. In addition, when this liquid suspension is injected into the water surrounding the torpedo, the freon evaporates thereby agitating the polymer in the freon and thus allows the long chain polymers to mix efficiently with the water. The following table indicates the proportions of long chain polymers and freon in an experimental suspension which reduces the time necessary to obtain a true solution with water by 75 percent.

TABLE I

| | |
|---|---|
| polyethylene oxide | 30% |
| Freon | 70% |
| polyacrylamide | 30% |
| Freon | 70% |
| Separan AP-30 | 30% |
| Freon | 70% |

Separan AP-30 is a proprietary product of the Dow Chemical Company of Midland, Michigan. It will be appreciated that fluorocarbons which are not solvents for the above polymers and which have vapor pressures above ambient pressures may be used with long chain polymers such as those which give drag reduction when in dilute water solutions.

It will also be appreciated that the proportion of fluorocarbon to polymer is not critical, although the proportions shown in Table I provide the best results for reducing drag on a moving aquatic vehicle.

Preagitation of the freon and polymer prior to injection increases the uniformity of the suspension. This agitation may be accomplished by venting the vapor above the liquid freon. This is essentially a boiling phenomenon which occurs when the ambient pressure above the Freon is lowered. This agitation is advantageous but is not essential in providing efficient drag reduction.

What is claimed is:

1. A composition for use in reducing the frictional drag on a water craft, comprising
    a suspension of a long chain water soluble polymer in a liquid fluorocarbon carrier in which said polymer is insoluble,
    said carrier having a vapor pressure above any ambient pressure to which said craft may be subjected,
    the premixing of said suspension being aided by the vapor of said liquid carrier being vented from the means containing the polymer and carrier.

2. The composition as recited in claim 1 wherein said polymer is selected from the group of polymers consisting of
    polyethylene oxide
    polyacrylamide
    polyvinylpyrrolidone
    amylose
    amylopectin
    hydroxyethyl cellulose
    sodium carboxymethyl cellulose
    polyvinyl alcohol
    silicone and
    polyacrylic acid.

3. The composition as recited in claim 2 wherein said carrier is liquid Freon and the proportions of said materials are on the order of 70 percent Freon and 30 percent polymer.

* * * * *